March 13, 1962 R. J. GREEN 3,025,435

CASING FOR SEMICONDUCTOR DIODE

Filed May 15, 1959

INVENTOR
RALPH J. GREEN
BY
Eyre, Mann & Lucas
ATTORNEYS 3,025,435

CASING FOR SEMICONDUCTOR DIODE

Ralph J. Green, Newark, N.J., assignor to Tung-Sol Electric Inc., a corporation of Delaware Filed May 15, 1959, Ser. No. 813,441
3 Claims. (Cl. 317—234)

This invention relates to a case for a semiconductor diode and has particular reference to a refillable receptacle for rectifier units so that various types of diodes may be used in the case and new ones substituted for damaged crystals.

Silicon diodes and other types of rectifier units are generally enclosed in a permanent case with the diode element soldered to a portion of the case and the case elements permanently joined to each other. Such an element cannot be taken apart without the application of heat and new elements can only be installed in such cases with considerable effort and expense. The present invention permits the use of many different types of diodes in a single case and therefore adds considerable value to such components, especially when used for experimental diodes in the laboratory.

One of the objects of this invention is to provide an improved case for semiconductor diodes which avoids one or more of the disadvantages and limitations of prior art arrangements.

Another object of the invention is to permit interchange of different types of crystal diodes in the same case.

Another object of the invention is to permit the rapid substitution of a new crystal for one that has been damaged by excessive current.

Another object of the invention is to lower the cost of diode rectifier components by supplying a single refillable case which can be used with a large variety of diode rectifier units.

The invention comprises a case for a crystal diode which includes a cylindrical or hexangular base having an axial cavity with a female screw thread formed on its inner wall. A cooperating hollow cylindrical shell is threaded into the base and mechanically engages a terminal of the crystal diode. The shell is terminated at its unthreaded end by a solid insulator in which is secured a conductive wire which makes resilient contact with a second terminal of a crystal diode.

One feature of the invention is a deformable plastic washer which is disposed between parallel annular surfaces of the base and the shell for hermetically sealing the case.

For a better understanding of the present invention, together with other and further objects thereof, reference is made to the following description taken in connection with the accompanying drawings.

Figure 1:
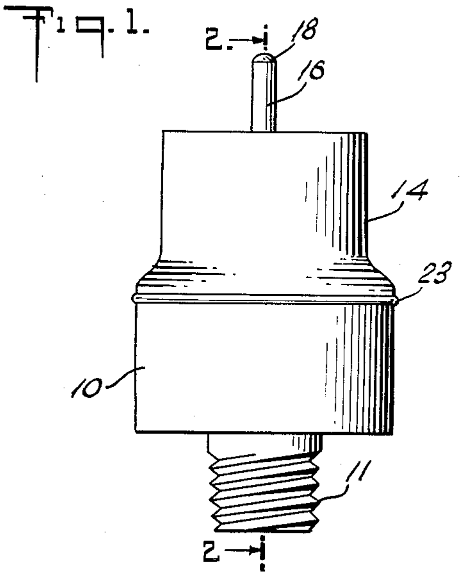
FIG. 1 is a side view of the case.

Referring now to the drawings, the case includes a base 10 having a screw thread 11 at its bottom end for mechanical and electrical connection to a portion of an electrical circuit. The base 10 is formed with a cavity 12 and a female screw thread 13 on the inner wall of the cavity. A hollow cylindrical shell 14 cooperates with the base and includes a male threaded portion which is screwed in the base to hold a rectifier unit. The shell 14 is terminated at its upper end by a flat disc of insulating material 15 which may be glass or any other suitable insulating material. At the center of insulator 15 a metal tube 16 is mounted and a conductive wire 17 is positioned in the tube and soldered in permanent relation thereto by a small dot of solder 18 which seals the tube from the atmosphere. The lower portion of wire 17 is formed in a loop 20 or in a helix or any other type of configuration which gives resiliency to the wire and offers an elastic contact with one terminal 21 of the rectifier element.

Figure 2:
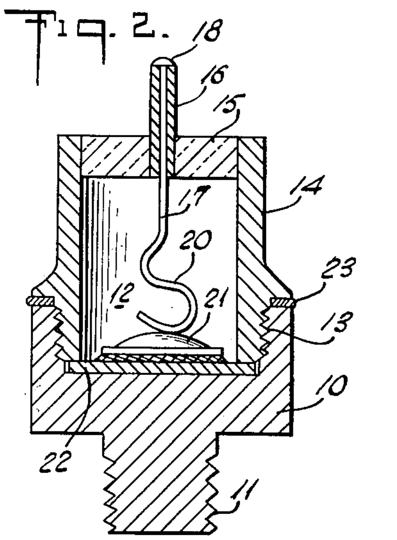
FIG. 2 is a cross sectional view of the case shown in FIG. 1 taken along line 2—2 of that figure.

Rectifier elements for this type of case are made with a metal base 22 which may be of Kovar or any other metal which permits ohmic contact with one of the rectifier terminals. As shown in FIG. 2, the lower end of shell 14 engages the periphery of the metal base 22 and clamps it securely against the bottom of cavity 12 in the base 10. This clamping arrangement is important since all the current passing through the diode rectifier must traverse the contact between rectifier base 22 and base 10 and this contact should have a very low resistance in order not to generate heat. In order to seal the case from the atmosphere, a resilient washer 23 is placed between annular surfaces of the base 10 and the cylinder 14. This washer can be made of any good resilient material such as rubber or a pliable plastic.

When the case is closed, the spring wire 20 first makes contact with the central portion of diode and presses the diode unit against the base 10. Turning the cylinder 14 into final engagement with the base 10 securely clamps the base portion 22 of the diode against the base 10 and provides good ohmic contact for both diode electrodes.

Figure 3:
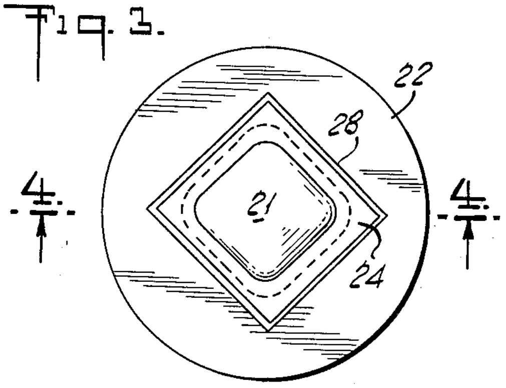
FIG. 3 is a plan view, to an enlarged scale, of a rectifier unit which can be used in the case shown in FIGS. 1 and 2.
Figure 4:
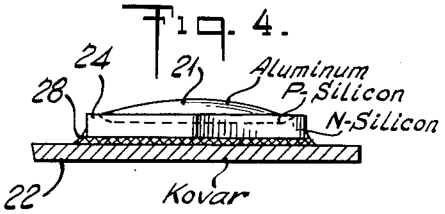
FIG. 4 is a cross sectional view, partly in elevation, of the crystal diode shown in FIG. 3 and is taken along line 4—4 of that figure.
Figure 5:
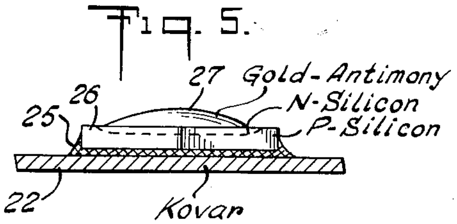
FIG. 5 is a cross sectional view similar to FIG. 4 but showing another type of diode unit.

The rectifiers shown in FIGS. 3, 4 and 5, are illustrative of the types that can be used in the case shown in FIGS. 1 and 2. The rectifier diode shown in FIGS. 3 and 4 is made by first depositing a thin sheet of gold-antimony solder 28 on the Kovar base. This solder may contain 99.4% gold and .06% antimony although any other type of solder may be used provided it presents an ohmic contact to the crystal unit. A small pellet of aluminum is now put on a flat piece of N-type silicon 24 and heated to melt the aluminum and cause it to alloy with the silicon 24. Upon cooling the alloyed silicon recrystallizes out carrying with it a small amount of aluminum which thus converts a thin layer of the silicon to P-type semiconductor. The silicon 24 having the aluminum alloyed thereto is placed on the solder sheet 28 and the assembly placed in a furnace and heated until the solder melts, thereby binding the silicon to the Kovar permanently. The rectifier unit is now complete and may be installed in the case to serve as an electrical rectifier unit.

The rectifier crystal shown in FIG. 5 is similar to that shown in FIGS. 3 and 4 but is made with different types of material and has reversed polarity. A Kovar base 22 is employed as before and a thin sheet of solder material 25 is placed on the Kovar but in this type of rectifier the solder is made of 97.5% gold and 2.5% gallium. A small square of P-type silicon 26 is now placed on the solder and the combination is heated in a furnace as before, to melt the solder and join the silicon and Kovar by an ohmic contact. Next, a small pellet of gold-antimony 27 is placed on top of the silicon and the combination heated in a furance again to first melt the gold-antimony and then to diffuse a small portion of the alloy into the P-type silicon to produce a thin shell of N-type silicon next to the alloy. This completes the rectifier unit.

It will be obvious that many other types of rectifier units can be used in the above described case, the only requirement being that the crystal unit is soldered to a metal disc for one terminal, and that the unit includes a metal electrode which makes good contact with the resilient wire 20 for the other terminal.

The foregoing disclosure and drawings are merely illustrative of the principles of this invention and are not to be interpreted in a limiting sense. The only limitations are to be determined from the scope of the appended claims.

I claim:

1. A case for a crystal diode comprising, a base having an axial cavity with a female screw thread formed on its inner wall, a cooperating hollow cylindrical shell having a male screw thread on its outer wall for mechanically engaging said female thread, said shell terminated at its unthreaded end by a solid insulator in which is secured a conductive wire for resilient contact with one terminal of said crystal diode, clamping means between the base and the shell for securely holding a metal disc which is soldered to one terminal of the crystal diode and resilient sealing means positioned between a portion of said base and a portion of said shell.

2. A reusable case for a crystal diode comprising, a cylindrical base having an axial cavity with a female screw thread formed on its inner wall, a cooperating hollow cylindrical shell having a male screw on its outer wall for mechanically engaging said female thread, said shell terminated at its unthreaded end by a solid insulator in which is secured a conductive wire for resilient contact with one terminal of said crystal diode, clamping means between the base and the shell for securely holding a metal disc which is soldered to one terminal of the crystal diode, and a deformable washer disposed between parallel annular surfaces of said base and said shell for sealing the case.

3. A case for a crystal diode as set forth in claim 2 wherein said conductive wire is bent to form a resilient spring.

References Cited in the file of this patent

UNITED STATES PATENTS

| | | |
|---|---|---|
| 2,790,940 | Prince | Apr. 30, 1957 |
| 2,820,929 | Coy | Jan. 21, 1958 |